(12) United States Patent
Sugano et al.

(10) Patent No.: US 7,766,196 B2
(45) Date of Patent: Aug. 3, 2010

(54) HORIZONTAL-JETTING STRUCTURE AEROSOL PRODUCT (75) Inventors: Koki Sugano, Ako (JP); Katsuyoshi Kado, Ako-gun (JP); Teruki Yamamoto, Funabashi (JP); Naoki Takahashi, Ageo (JP)

(73) Assignees: Earth Chemical Co., Ltd., Tokyo (JP); Maruichi Valves Co., Ltd., Saitama (JP)

( * ) Notice: Subject to any disclaimer, the term of this patent is extended or adjusted under 35 U.S.C. 154(b) by 550 days.

(21) Appl. No.: 11/399,481

(22) Filed: Apr. 7, 2006

(65) Prior Publication Data

US 2006/0255077 A1    Nov. 16, 2006

Related U.S. Application Data (63) Continuation-in-part of application No. PCT/JP03/12993, filed on Oct. 9, 2003.

(51) Int. Cl.
*B65D 83/20*    (2006.01)
(52) U.S. Cl. .................. 222/402.13; 222/323; 222/470; 222/79
(58) Field of Classification Search ............ 222/402.13, 222/402.14, 402.15, 469, 79, 470, 472, 323, 222/324
See application file for complete search history.

(56) References Cited

U.S. PATENT DOCUMENTS

| | | | | | |
|---|---|---|---|---|---|
| 2,530,583 | A | * | 11/1950 | Nurkiewicz | ............ 222/402.15 |
| 4,413,756 | A | * | 11/1983 | Kirley | .................... 222/402.11 |
| 4,454,963 | A | * | 6/1984 | Fegley | ............................ 222/5 |
| 4,742,963 | A | * | 5/1988 | Marvaldi | ..................... 222/472 |
| 5,702,036 | A | * | 12/1997 | Ferrara, Jr. | ............. 222/402.13 |
| 6,126,046 | A | * | 10/2000 | Baculy | ........................ 222/505 |
| 6,742,599 | B1 | * | 6/2004 | Nam | ............................ 169/30 |
| 7,124,915 | B2 | * | 10/2006 | Restive | ................... 222/153.11 |
| 7,124,916 | B2 | * | 10/2006 | Groh et al. | ............. 222/402.13 |
| 7,252,210 | B1 | * | 8/2007 | Schultz et al. | .............. 222/174 |

FOREIGN PATENT DOCUMENTS

| | | | |
|---|---|---|---|
| JP | 2000-298779 | A | 10/2000 |
| JP | 2001-315872 | A | 11/2001 |
| JP | 2003-175987 | A | 6/2003 |
| JP | 2003-192059 | A | 7/2003 |
| JP | 2003-200982 | A | 7/2003 |
| JP | 3096635 | U | 9/2003 |

* cited by examiner

*Primary Examiner*—Kevin P Shaver
*Assistant Examiner*—Jonathan Wood
(74) *Attorney, Agent, or Firm*—Sughrue Mion, PLLC (57) ABSTRACT This invention provides an aerosol product for use in control of bees or horseflies, and more particularly a horizontal jetting structure aerosol product provided with a grip movably attached to a position orthogonal to an aerosol vessel body when contents are jetted, wherein during jetting when the grip is located at a position orthogonal to the aerosol vessel body, a maximum arrival distance of an effective component is 10 m or longer and a jetted quantity of the contents for an initial 5 sec is 40 g or more, thereby capable of jetting the contents of the aerosol vessel afar and exactly by a simple operation.

4 Claims, 7 Drawing Sheets

| TEST PREPARATION | TEST ITEM | JETTED QUANTITY FOR INITIAL 5 SEC | ARRIVAL DISTANCE | | | | | | | | | | | | RESULT |
|---|---|---|---|---|---|---|---|---|---|---|---|---|---|---|---|
| | | | 1m | 5m | 7m | 8m | 9m | 10m | 11m | 12m | 13m | 14m | 15m | |
| EXAMPLE A (DILUTED SOLUTION /GAS RATIO=50/50) | MAXIMUM ARRIVAL DISTANCE (APPLIED QUANTITY OF EFFECTIVE COMPONENT) | 50g | | 25.0μg | 2.47μg | 1.31μg | 1.57μg | 0.83μg | NONE | | | | | 10m |
| EXAMPLE B (DILUTED SOLUTION /GAS RATIO=40/60) | | 50g | | 43.6μg | 3.84μg | 2.05μg | 1.02μg | 1.10μg | 1.03μg | NONE | | | | 11m |
| EXAMPLE C (DILUTED SOLUTION /GAS RATIO=30/70) | | 40g | | 29.9μg | 6.41μg | 2.70μg | 7.05μg | 6.73μg | 3.62μg | 4.65μg | 5.55μg | 5.31μg | 7.15μg | 15m |
| COMPARATIVE EXAMPLE A (DILUTED SOLUTION /GAS RATIO=30/70) | | 35g | | 66.9μg | 15.9μg | 8.78μg | 5.36μg | 5.11μg | 4.19μg | 3.62μg | 2.26μg | 1.97μg | NONE | 14m |
| COMPARATIVE EXAMPLE B (DILUTED SOLUTION /GAS RATIO=75/25) | | 70g | | 1.40μg | NONE | | | | | | | | | 5m |

HORIZONTAL-JETTING STRUCTURE AEROSOL PRODUCT

This application is continuation-in-part application of International Application No. PCT/JP2003/012993 filed on Oct. 9, 2003

BACKGROUND OF THE INVENTION

1. Technical Field

This invention relates to an aerosol product equipped with a movable grip, and more particularly to a horizontal-jetting structure aerosol product capable of precisely jetting the contents within a vessel toward a target existing at a long distance from a nozzle by raising a grip from a stand-by position to a using position and operating a lever while grasping the grip so as to depress the nozzle.

2. Related Art

Generally, an aerosol product includes a valve for closing the mouth of a vessel, a nozzle connected to a stem of the valve and a cap encircling the valve. And when a user depresses the nozzle with his finger through an appropriate actuator, the contents high-pressure filled in the vessel are jetted.

However, this aerosol product has a problem of inferior operability that the user must depress the nozzle directly and strongly in an axial direction while compressing a spring incorporated in the valve.

Therefore the aerosol product capable of jetting the contents by small force has been demanded.

In order to meet such a demand, in recent years, the aerosol product having a lever extending in the radial direction of the nozzle has been in the actual use (for example, see Patent Reference 1).

Figure 5:
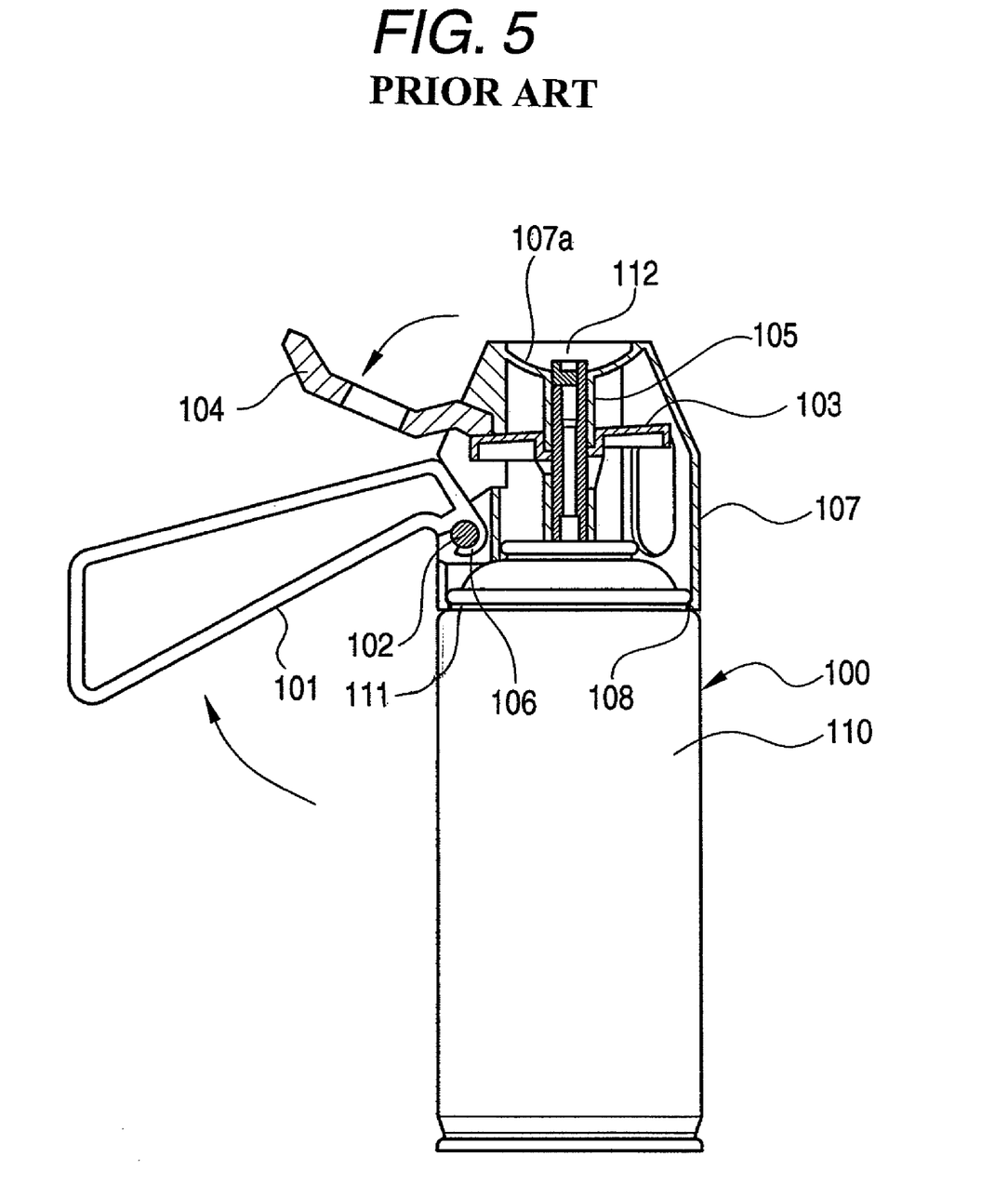
FIG. 5 is a view showing the construction of a conventional aerosol vessel equipped with a movable grip.

According to a prior art as shown in FIG. 5, a grip 101 arranged along an aerosol product 100 is raised in an arrow direction at a pivot of a supporting shaft 102.

Next, from the state where a first lever 103 and a second lever 104 have been folded and superposed, the second lever 104 is raised in an arrow direction at a pivot of the supporting shaft so as to be arranged on an extending line of the first lever 103.

Subsequently, the second lever 104 is held down with the hand grasping the grip 101 so that downward pressing force is applied to the second lever 104. Thus, the first and second levers 103 and 104 are integrally pushed downward and so a nozzle 105 is depressed.

In accordance with this prior art, as compared with the case where the nozzle 105 is depressed directly and strongly, an operator can operate the product by small force.

However, a fitting groove 106 of the grip 101 is fit over the supporting shaft 102 so that the grip 101 is supported by the supporting shaft 102. Therefore, the fitting groove 106 may be opened while the grip 101 is used. As a result, there was a fear that the grip 101 comes off from the supporting shaft 102.

Further, a peripheral wall 108 of a cap 107 is formed so that it is possible to confirm by tactile feel that the grip has been raised to a predetermined position when the grip 101 is raised in the arrow direction at a pivot of the supporting shaft 102.

However, since the peripheral wall 108 of the cap 107 is kept in direct contact with a mounting cup 111, when the grip 101 is raised, the pressing force applied to a convex portion cannot be relieved by deforming the peripheral wall 108. Thus, for example, there was a fear that the fitting groove of the grip 101 may be damaged.

Further, in using the aerosol product 100, from the state where a first lever 103 and a second lever 104 have been folded and superposed, the second lever 104 is raised in an arrow direction at a pivot of the supporting shaft.

So, in order to raise the second lever 104, a slit 107a is formed on the cap 107.

Thus, for example, when a finger is caught in the slit 107a, the nozzle 112 is pressed in with the inserted finger so that malfunction may occur.

As one of the methods for using the aerosol product, there is a demand that the contents (i.e. medicine such as biocide) within the aerosol vessel should be jetted exactly and simply toward a target such as a bee or horsefly from a long distance, the bee or horsefly being a harmful insect which may give great injury to humans.

SUMMARY OF THE INVENTION

In order to attain this object, it was necessary to improve the structure to realize an aerosol product peculiar to exactly jet the medicine toward the target such as a bee, horsefly, gnat or spider.

This invention has been accomplished in view of the above problems. An object of this invention is to provide a horizontal-jetting structure aerosol product capable of jetting the contents within an aerosol vessel afar and exactly by a simple operation.

1. An aerosol product provided with a grip movably attached to a position orthogonal to an aerosol vessel body when contents are jetted, characterized in that during jetting when the grip is located at a position orthogonal to the aerosol vessel body, a maximum arrival distance of an effective component is 10 m or longer and a jetted quantity of the contents for an initial 5 sec is 40 g or more.

2. The grip is connected to a cap of the aerosol vessel body and at the time of stand-by, is adapted to be horizontally movable to the side area of the aerosol product.

3. The grip is connected to a cap of the aerosol vessel body and at the time of stand-by, is adapted to be horizontally movable to the upper area of the aerosol product.

4. A slot for carrying is formed at the tip of the grip.

5. The tip of the grip where the slot for carrying is formed is housed in a groove formed on the upper surface of the cap.

6. The grip is connected to a cap of the aerosol vessel body and at the time of stand-by, is adapted to be housed vertically to an axial direction of the aerosol vessel.

7. The ratio of an undiluted solution to a jetting gas of the contents of the aerosol product is between 50/50 to 30/70.

8. When the entire quantity of contents of the aerosol vessel is jetted, an applied quantity on a target filter sheet of paper apart by 10 m is 0.8 μg/10 cm$^2$ or more.

In the invention, the "horizontal-jetting" refers to a state that jetting is conducted while the vessel body is held at a position perpendicular to the extending direction of the grip that is handled by an operator, as clearly understood from the drawings. Needless to say, the horizontal-jetting is not limited to jetting to the horizontal direction with respect to the direction of gravity. Accordingly, the horizontal-jetting structure aerosol product can be used to jet the contents in various angles according to application or location of a target etc.

In FIGS. 1(a) to 4, reference numeral 10 denotes an aerosol product; 11 a vessel body; 12 a stem; 13 a nozzle; 15 a cap (aerosol cap equipped with a movable grip); 16 a supporting shaft; 18 a peripheral wall; 19 a convex; 20 a lever; 21 a base; 22 a tip; 26 a pin supporting shaft; 30 a grip; 31 a fitting groove; 42 a reinforcement plate; P1 a stand-by position; P2 a using position; S2 a constant interval between the supporting shafts.

DETAILED DESCRIPTION OF THE PREFERRED EMBODIMENTS

Now referring to the attached drawings, an explanation will be given of various embodiments of this invention. Referring to FIGS. 1(a) and 1(b), an explanation will be given of the first embodiment of this invention.

FIG. 1(a) is a view showing the construction at using position P2 where the grip 35 has been raised. FIG. 1(b) is a view showing the construction at stand-by position P1 where the grip 35 has been put down.

The aerosol vessel 10 equipped with the movable grip according to the first embodiment of this invention as shown from FIGS. 1(a) and 1(b) is provided with a valve (not shown) for closing the mouth of the vessel body 11 in order to jet the contents filled at high pressure within the vessel body 11 which is cylindrical.

Further, the aerosol product 10 further includes a nozzle 13 connected to a stem 12 of the valve, a cap 15 encircling the nozzle 13 (aerosol cap equipped with a movable grip) and a lever 20 engaged to the nozzle 13 and extending in a radial direction of the nozzle 13. The cap 15 is provided with the grip 30 supported rotatably between the stand-by position P1 and the using position P2 through the supporting shaft 16.

The lever 20 includes an area on the base 21 side and an area on the tip 22 side and is arranged so that the area on the base 21 side extends radially within the cap 15. The base 21 is rotatably attached to the inner wall of the cap 15.

At an intermediate portion of the base 21 side, a through-hole 24 is formed. The nozzle 13 penetrates through the through-hole 24.

The lever 20 is swingably supported on the nozzle 13 through a pin supporting shaft 26. The center of the pin supporting shaft 26 is located at a position apart from a stem fitting area 27 by S1 (2 to 6 mm).

As described above, since the lever 20 is rotatably supported by the pin supporting shaft 26, when the nozzle 13 is operated using the lever 20, it can be operated without being almost shifted from the axial center.

Further, in the aerosol product 10 equipped with the aerosol cap with the movable grip, the area on the tip 22 side of the lever 20 is projected from the cap. So a finger can be put on the tip 22 of the lever 20.

By depressing the tip 22 of the lever 20 with a finger so that the lever 20 is swung downward on a fulcrum of the supporting shaft 23 of the base 21, the nozzle 13 is pressed downward through the pin supporting shaft 26.

Thus, the valve is opened so that the contents within the vessel body 11 are jetted from the jetting mouth 13A of the nozzle 13.

By rotatably supporting the base 21 of the lever 20 on the cap 15 and also projecting the tip 22 of the lever 20 from the cap 15, it is not necessary to form the slit explained in connection with the prior art.

Thus, it is possible to prevent the finger from erroneously being caught in the slit so that the finger erroneously operates nozzle.

The cap 15 is provided with a guard 17 for guarding the tip 22 of the lever 20 projected from the cap 15.

Since the cap 15 is provided with the guard 17 to guard the tip 22 of the lever 20, it is possible to hinder the lever 20 from being inadvertently operated, thereby preventing an erroneous operation of the lever 20.

On the side wall of the vessel body 11, now below the lever 20, the cap 15 is provided with the grip 30 which is rotatable between the stand-by position P1 and the using position P2 through the supporting shaft 16.

The grip 30 is constructed so as to be rotatably supported on the supporting shaft 16 in such as manner that the base 32 is provided with a fitting groove 31 to be fittable over the supporting shaft 16 and the fitting groove 31 is fit over the supporting shaft 16. At an intermediate position of the fitting groove 31, a bridge 33 for enforcement is provided.

In accordance with the structure shown in FIGS. 1(a) and 1(b), the positional relationship between the vessel body 11, and the grip 30 and lever 20 is very stable so that the user can jet the contents within the aerosol vessel by a simple operation afar and exactly.

In accordance with the above aerosol product, during the jetting when the grip is located at the position vertical to the aerosol vessel, the contents can be jetted in the maximum arrival range of their effective component up to 10 m or more and with a quantity of 40 g or more for an initial 5 sec.

In this case, by supporting the aerosol vessel body by a user's shoulder or one hand, the contents within the aerosol vessel can be jetted more stably toward a target such as a bee, horsefly, gnat or spider.

Next, referring to FIGS. 2(a) and 2(b), an explanation will be given of the second embodiment of this invention.

FIG. 2(a) is a view showing the construction at the using position where the grip 35 has been raised. FIG. 2(b) is a view showing the construction at the stand-by position where the grip 35 has been put down.

The aerosol vessel 10 equipped with the movable grip according to the second embodiment of this invention as shown from FIGS. 2(a) and 2(b) is provided with a valve (not shown) for closing the mouth of the vessel body 11 in order to jet the contents filled at high pressure within the vessel body 11 which is cylindrical.

Further, like FIGS. 1(a) and 1(b), the aerosol product 10 further includes a nozzle 13 connected to a stem of the valve, a cap 15 encircling the nozzle 13 (aerosol cap equipped with a movable grip) and a lever 20 engaged to the nozzle 13 and extending in a radial direction of the nozzle 13. The cap 15 is provided with the grip 30 supported rotatably between the stand-by position and the using position through the supporting shaft 16.

A main difference from the first embodiment shown in FIGS. 1(a) and 1(b) resides in that in the first embodiment shown in FIGS. 1(a) and 1(b), the lever 20 is engaged to the nozzle 13 whereas in the second embodiment shown in FIGS. 2(a) and 2(b), the lever and nozzle are integrally formed and resides in the manner of attaching the grip to the cap. However, the functions in both embodiments are coincident in that the contents within the aerosol vessel can be jetted afar and exactly by a simple operation.

Incidentally, although not shown, the aerosol product according to this invention is desirably provided with a function (childproof) for preventing the contents from readily jetted so that a baby does not erroneously use it.

Next, referring to FIG. 3, an explanation will be given of the third embodiment of this invention.

Figure 1:
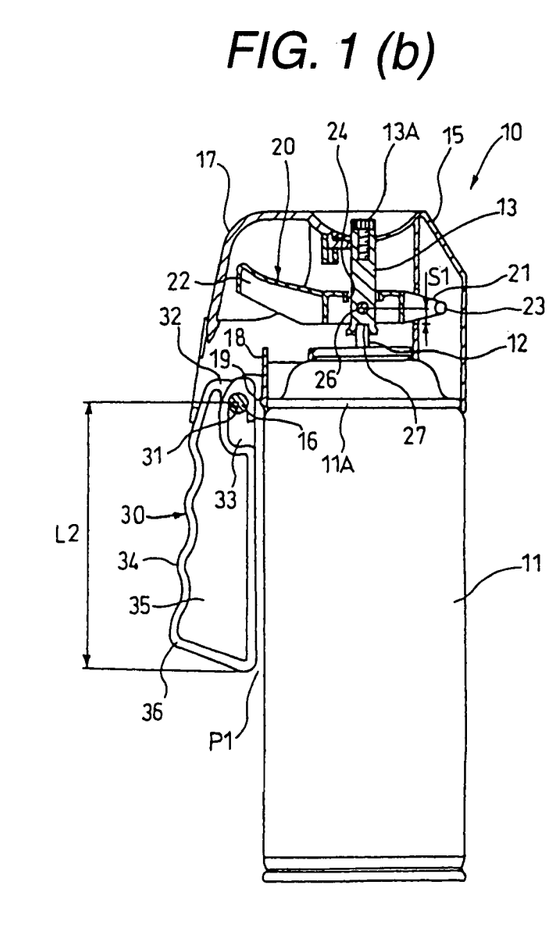
FIGS. 1(a) and 1(b) are views showing the construction of a first embodiment of a horizontal-jetting structure aerosol product equipped with a movable grip according to this invention.
Figure 2:
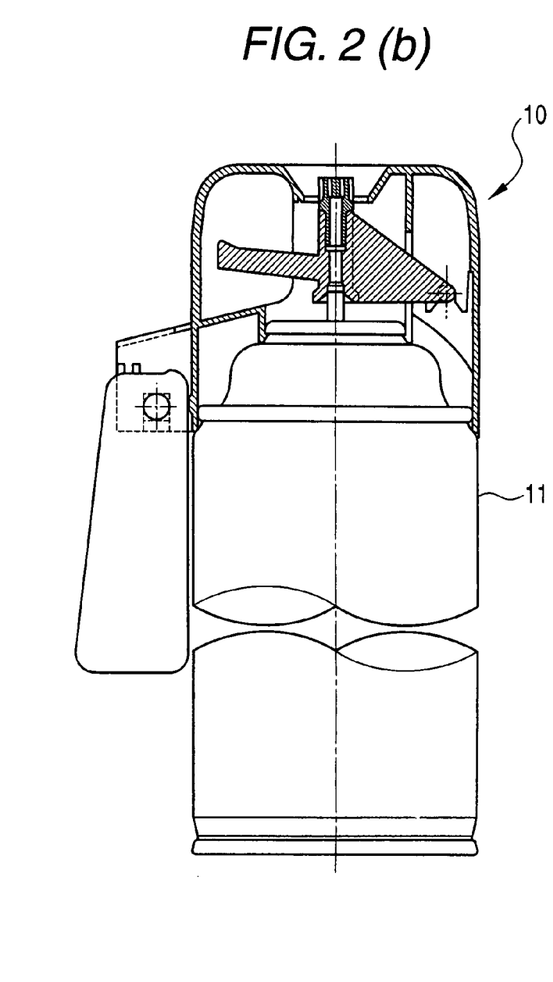
FIGS. 2(a) and 2(b) is a view showing the construction of a second embodiment of a horizontal-jetting structure aerosol product equipped with a movable grip according to this invention.
Figure 3:
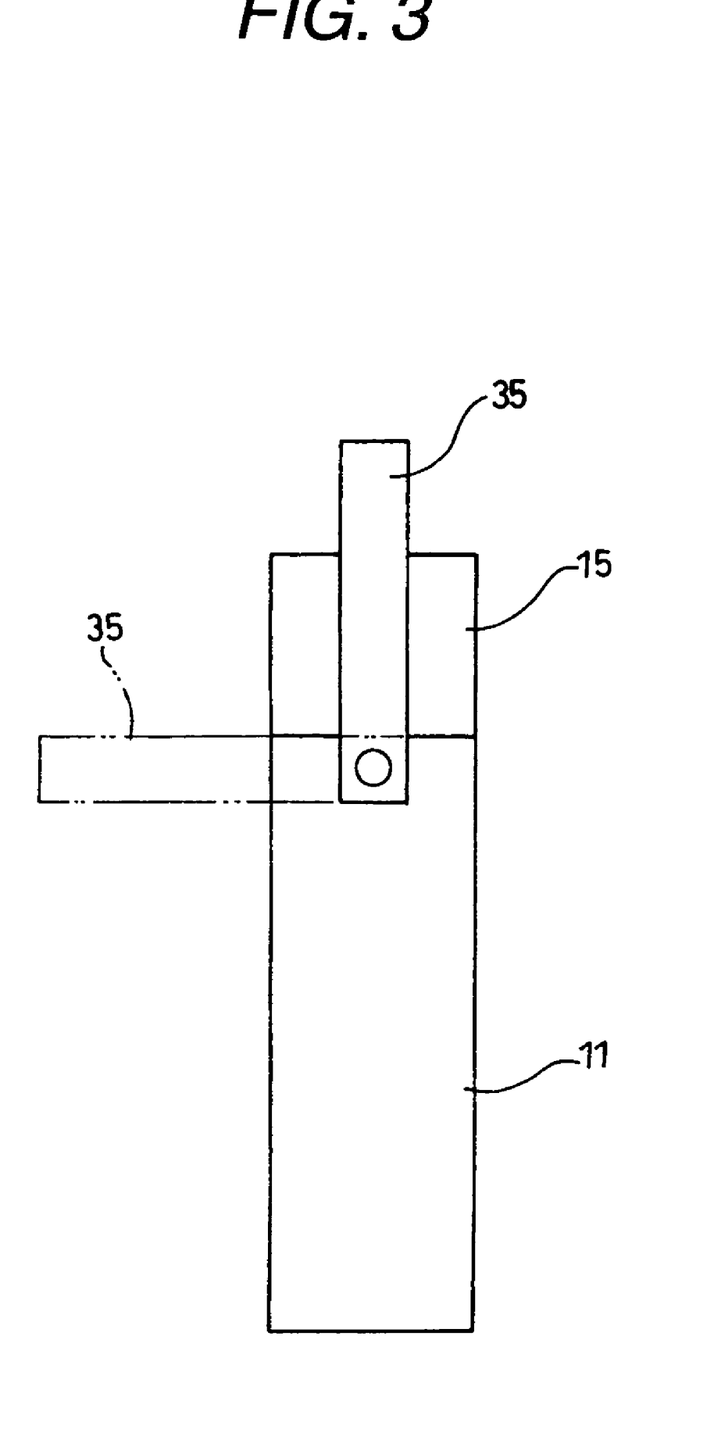
FIG. 3 is a view showing the construction of a third embodiment of a horizontal-jetting structure aerosol product equipped with a movable grip according to this invention.

FIG. 3 illustrates, in dotted line, the shape at the using position where the grip 35 has been raised and illustrates in solid line the shape at the stand-by position where the grip 35 has been put down.

In accordance with the structure as shown in FIG. 3, in the shape at the stand-by position (while keeping) where the grip 35 has been put down, since the grip is located at the upper position of the vessel body, the size of the vessel body in a transversal (longitudinal) direction can be reduced. So the keeping space can be saved.

Further, a slot (not shown) permitting a hand's finger to be inserted may be formed at the area projecting from the upper surface of the cap 15. In this way, the product can be made transportable in a handbag manner.

Further, a depression may be formed at the center of the cap in flush with the cap so that the grip is projected from the bottom of the depression, and a slot may be formed at the projection area. Thus, aerosol products can be vertically stacked.

Next, referring to FIG. 4, an explanation will be given of the fourth embodiment of this invention.

Figure 4:
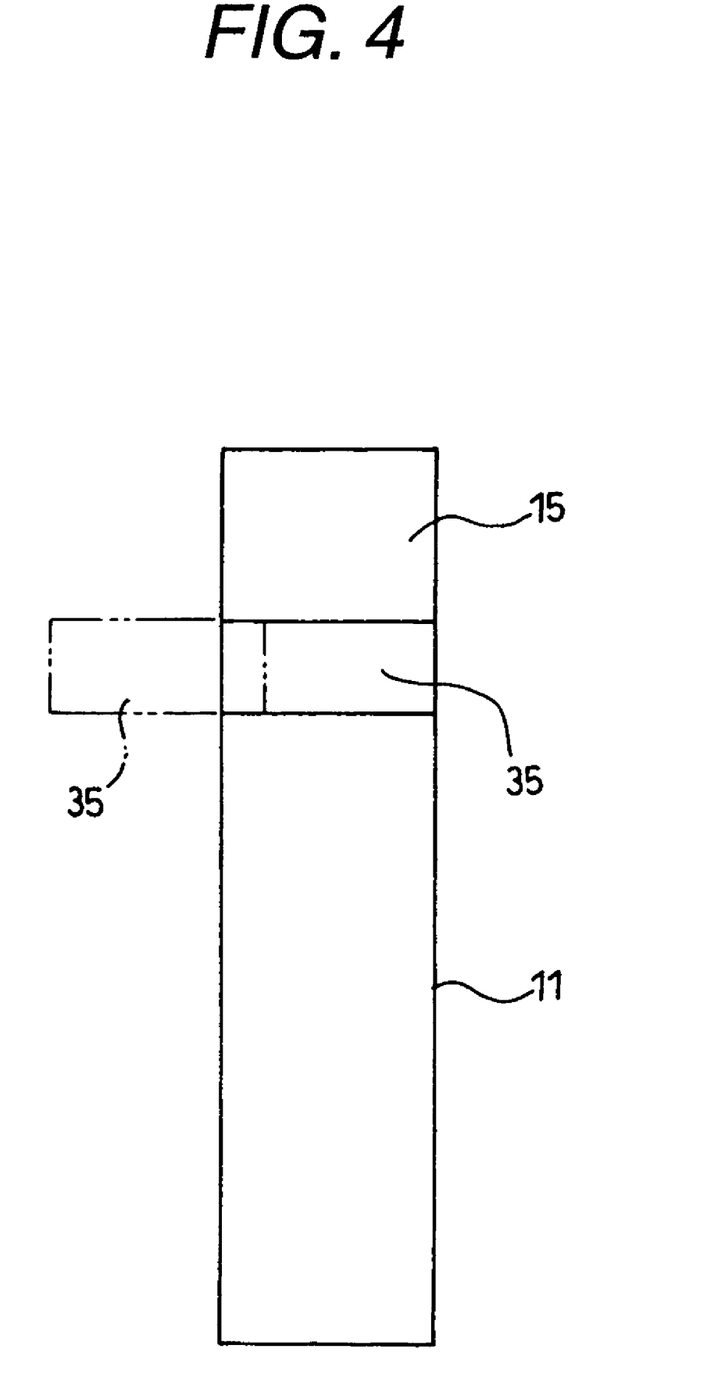
FIG. 4 is a view showing the construction of a fourth embodiment of a horizontal-jetting structure aerosol product equipped with a movable grip according to this invention.

FIG. 4 illustrates, in dotted line, the shape at the using position where the grip 35 has been pulled out from the vessel body 11 and illustrates, in solid line, the shape at the stand-by position where the grip 35 has been returned into the vessel body 11.

In accordance with the structure as shown in FIG. 4, in the shape at the stand-by position (while keeping) where the grip 35 has been returned into the vessel body 11, since the grip is located within the vessel body, the size of the vessel body in a transversal (longitudinal) direction can be reduced. Thus, aerosol products can be vertically stacked and can be exhibited in a manner packed horizontally so that the keeping space can be saved.

Next, an explanation will be given of the advantage that in accordance with the horizontal-jetting structure aerosol products as shown in FIGS. 1A to 4, the contents can be jetted afar and exactly.

Figure 6:
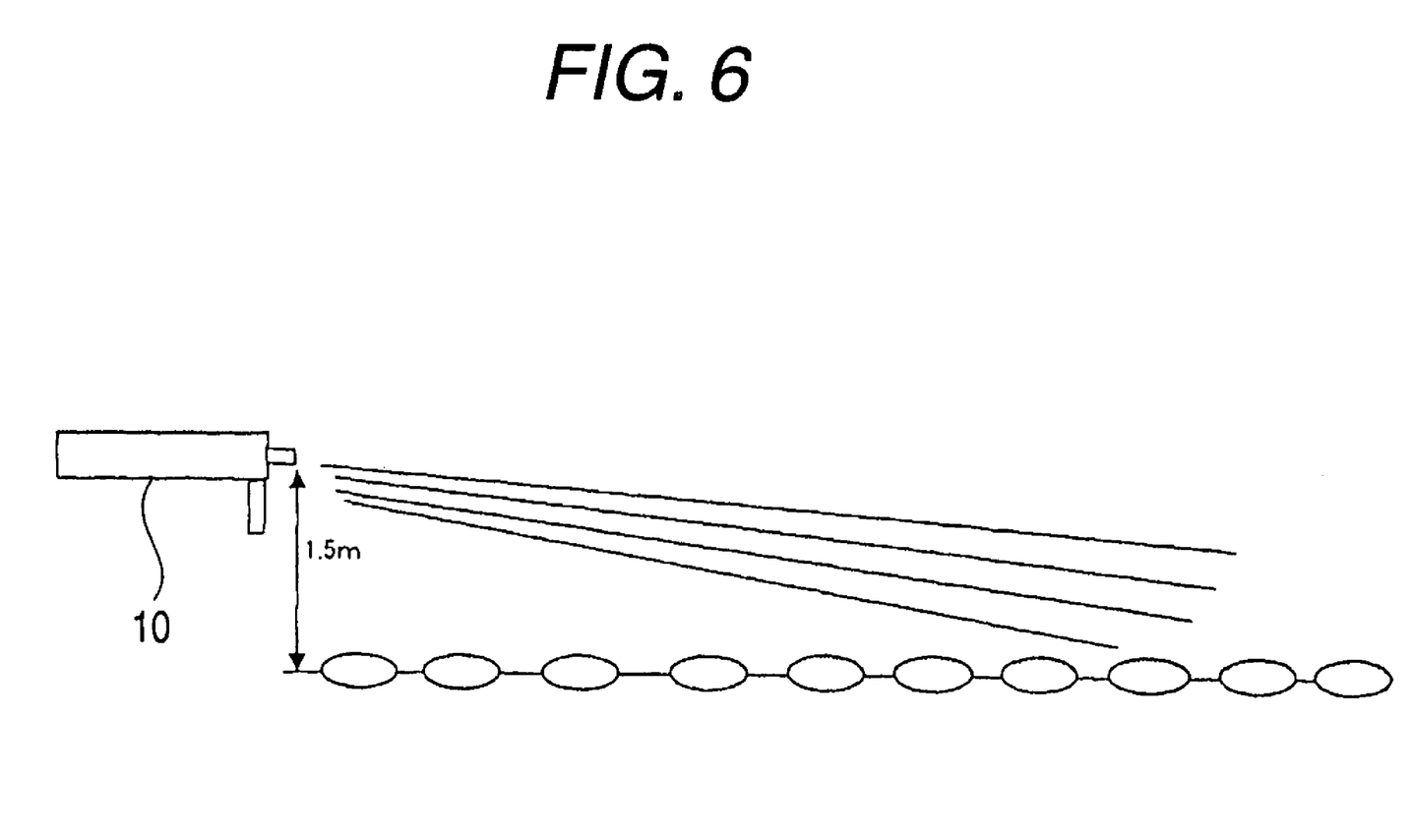
FIG. 6 is a view for explaining the measuring theory of an arrival range owing to jetting the contents of an aerosol vessel.

FIG. 6 is a view for explaining the theory for measuring the arrival distance by jetting of the contents of the aerosol vessel.

In FIG. 6, the aerosol product is horizontally jetted at a height of 1.5 m.

In this case, sheets of filter paper were located at distances of 5 m, 7 m, 8 m, 9 m, 10 m, 11 m, 12 m, 13 m, 14 m and 15 m. Upon completion of jetting, the sheets of filter paper were collected for analysis. In the analysis, the applied quantity of an effective component per 10 $cm^2$ was measured to confirm the arrival distance.

Figure 7:
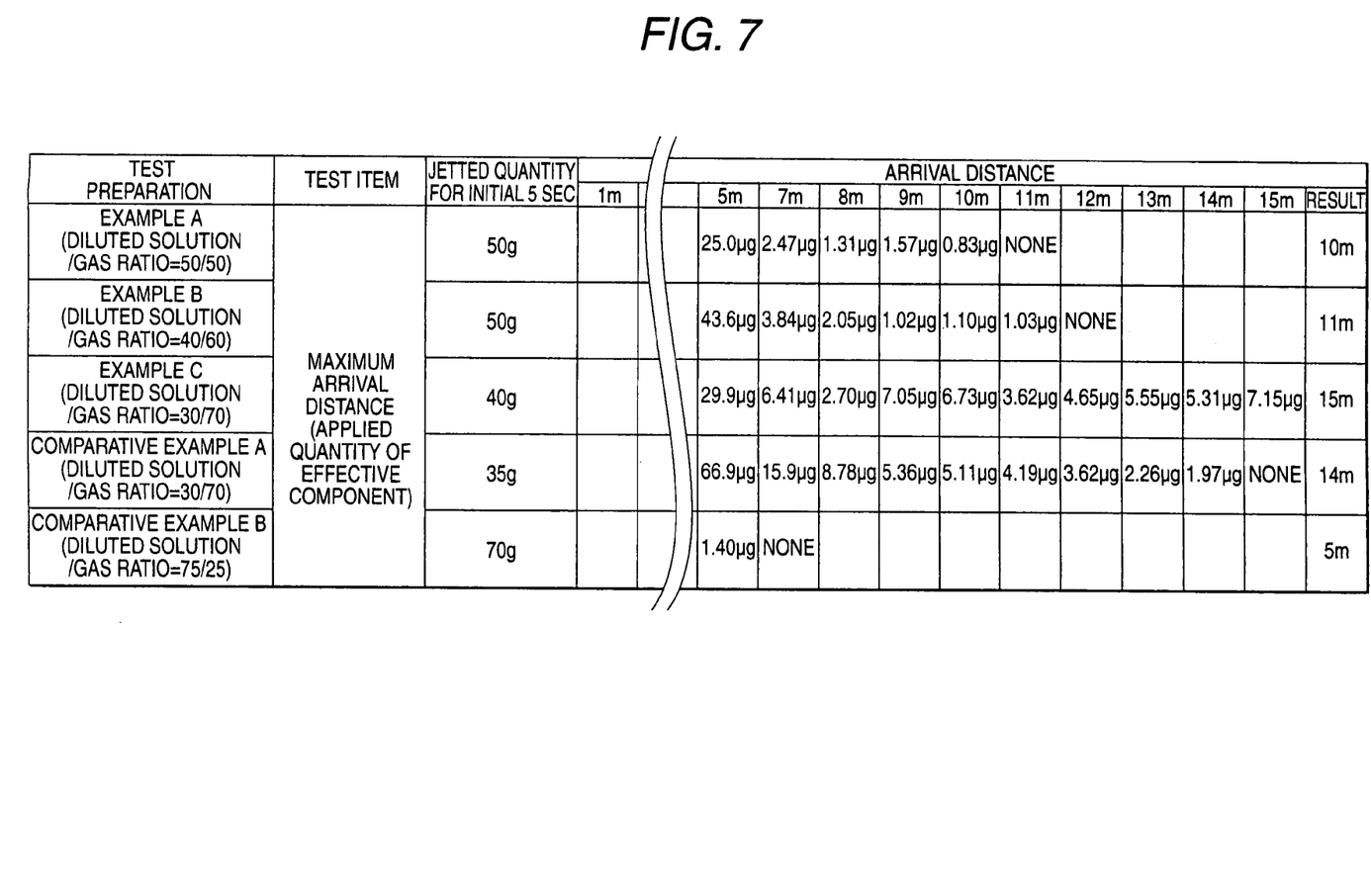
FIG. 7 is a table showing the test results of Examples A, B and C of this invention and a comparative example.

An example of the measurement result is shown in FIG. 7.

From this measurement result, it can be understood that the maximum arrival distance is related to the ratio of a undiluted solution to a propellant (gas).

Further, the quantity of the contents jetted from the above aerosol vessel is changed by adjusting the total area of the jetting slot of the nozzle, stem diameter, housing diameter, and internal pressure (kind and quantity of the propellant and ratio of the undiluted solution to the propellant).

However, since the aerosol product is employed to control harmful insects, it is not simply better if the maximum arrival distance of the effective component is longer. If not a certain or more jetted quantity of the contents (undiluted solution) is gained in a short time, the purpose of exterminating the harmful insects can be attained.

The applicant of this invention carried out various tests. As a result, as a condition of the horizontal-jetting structure aerosol product, it was found that harmful insects can be effectively controlled if the maximum arrival distance of the effective component is 10 m or longer and the jetted quantity of the contents for an initial 5 sec is 40 g or more during jetting where the grip is located at the position perpendicular to the aerosol vessel body.

Next, the measurement results of the maximum arrival distance of the effective component and of the jetted quantity of the contents for the initial five sec are illustrated in FIG. 7 in comparison between the above examples A to C and comparative examples A and B.

In FIG. 7, among the horizontal-jetting structure aerosol products according to the first embodiment of this invention, example A refers to the undiluted solution/gas ratio of 50/50; example B refers to the undiluted solution/gas ratio of 40/60; and example C refers to the undiluted solution/gas ratio of 30/70.

As a target for comparison, in the aerosol product as shown in FIG. 5, comparative example A refers to the undiluted solution/gas ratio of 30/70; and comparative example B refers to the undiluted solution/gas ratio of 75/25.

As seen from FIG. 7, the examples A, B and C satisfy the condition that the maximum arrival distance of the effective component is 10 or longer and the jetted quantity of the contents for the initial 5 sec is 40 g or more.

On the other hand, the comparative example A, in which the percentage of the gas was increased to the undiluted solution/gas of 30/70, can satisfy the condition that the maximum arrival distance is 10 m but cannot satisfy the condition of the jetted quantity of the contents because it is 35 g. Thus, the comparative example A was not appropriate for control of harmful insects.

Further, the comparative example B, in which the percentage of the undiluted solution was increased to the undiluted solution/gas of 75/25, can satisfy the condition for control of harmful insects in the jetted quantity of the contents for the initial 5 sec because it is 70 g, but cannot satisfy the condition of 10 m because the maximum arrival distance is up to 5 m.

The composition for insecticide in the undiluted solution (medicine solution) in this invention should not be limited as long as it is effective to control bees. However, it may be pyrethroid compound such as natural pyrethrin, prallethrin, imiprothrin, phthalthrin, allethrin, transfluthrin, resmethrin, phenothrin, cyphenothrin, permethrin, cypermethrin, etofenprox, cyfluthrin, deltamethrin, biphenthrin, fenvalerate, fenpropathrin, (S)-2-methyl-4-oxo-3-(2-propenyl)-cyclopento- 2-enyl(1R)-trans-3-(2,2-dichlorovinyl)-2,2-dimethylcyclopropanecarboxylate or S-1264; organic phosphorus compound such as dichlovos; carbamate compound; isomer of these compound, derivative, etc.

These compounds may be used alone or as a mixture of two or more kinds. They are contained in the undiluted solution by 0.1 to 5 weight %, or preferably 0.2 to 1 weight %.

Further, in view of the efficiency of exterminating bees, preferably, phthalthrin (particularly, d-T80-phthalthrin) and etofenprox are mixed. Both are preferably contained in the undiluted solution at a weight ratio of 3:1 to 1:1.

Further, mint oil or orange oil may be mixed, thereby improving the effect of knocking down the bees.

The solvent may be water; aromatic hydrocarbon such as alkylbenzene; coal oil; saturated hydrocarbon such as paraffin hydrocarbon or naphthene hydrocarbon; non-saturated hydrocarbon such as octane; alcohol such as isopropyl alcohol, ethyl alcohol, oleyl alcohol or lauryl alcohol; ester such as isopropyl myristate; glycol such as polyethylene glycol or polypropylene gricol; ether such as alkylphenyl ether; chlorinated solvent such as dichloromethane; fluoro solvent; and silicon solvent.

The compounds may be used alone or mixedly. They are preferably contained in the undiluted solution at a 90 to 99.9 weight %.

Further, in order to enhance emulsification and dispersion of the component of insect control, surfactant such as POE alkylether or POE fatty ester, or dissolution assistant such as lactate or polyvinylpyrolidone may be added. In order to increase the effect of the component of the insect control, synergist such as piperonylbutoxycide, N-octylbicycloheptane di-carboxyimide (MGK264), 1,1'oxybis [2,3,3,3-tetrachloropropane] (S421) may be added. In order to increase the application of bees to a nest, a spreader such as lanolin may be added. In order to lessen a bad odor, natural essential oil such as lavender oil or synthesized aromatizing agent such as geraniol may be added. In order to paralyze bees, pentane, or 2,3, dihydrodecaphloropentane (Vertrel XF) may be added.

The jetting agent (gas) may be a compressed gas such as nitrogen gas, compressed air or acid gas; hydrofuruorocarbon such as HFC-152a or HFC-134a; liquefied gas such as dimethyl ether; or liquefied oil gas such as propane, butane or isobutene. The agent may be used alone or as a mixture of two or more kinds.

Incidentally, the pressure (internal pressure of the aerosol vessel) may be 4 to 9 kg/cm$^2$ at 25° C.

The aerosol product according to this invention is effective to *Polistes* (long-legged bees) such as *Polistes jadwigae, Polistes Chinensis antennalis, Polistes japonicus Polistes rotheneyi* or *Polistes nipponensis*; Vespidae such as *Vespa simillima, Vespa mandarinia* or *Vespa analis*; bees such as carpenter bees or honeybees; gnats; spiders; and horseflys.

INDUSTRIAL APPLICABILITY

In accordance with the invention, there is provided a horizontal-jetting structure capable of jetting the contents of an aerosol vessel afar and exactly by a simple operation. So this invention is effective to control bees or horseflies. Its industrial applicability is very great.

What is claimed is:

1. A horizontal-jetting structure aerosol product comprising:
    an aerosol vessel body;
    a nozzle communicating with the aerosol vessel body for jetting contents from the aerosol vessel body in an ejection direction which is parallel to an axial direction of the aerosol vessel body;
    a grip which is movably supported by a cap between an operative position, at which the grip is orthogonal to the aerosol vessel body and the contents are to be jetted and an inoperative position, at which the grip is parallel with the axial direction of the aerosol vessel body and the contents are not to be jetted;
    a lever associated with the nozzle and extending in a direction which is orthogonal to the nozzle, the lever including a base which is rotatably attached to an inner wall of the cap through a supporting shaft and a distal tip which is disposed substantially in parallel with the grip when the grip is in the operative position and is at a distal end of the lever opposite the base; and
    a guard associated with the cap for preventing the lever from being inadvertently operated, said guard partially surrounding at least an upper side of the distal tip of the lever which faces the ejection direction,
    wherein, when the lever is operated, the nozzle is directly and immediately opened to jet the contents of the aerosol vessel body,
    wherein a maximum arrival distance of an effective component is 10 m or longer and a jetted quantity of the contents for an initial 5 sec is 40 g or more, and
    wherein when the entire quantity of contents of said aerosol vessel is jetted, an applied quantity on a target filter sheet of paper 10 m away from said aerosol vessel is 0.8 μg/10 cm$^2$ or more.

2. A horizontal jetting structure aerosol product according to claim 1, wherein when the grip is in the inoperative position, the grip is provided at a side area of said aerosol vessel body.

3. A horizontal jetting structure aerosol product according to claim 1, wherein a ratio of an undiluted solution to a jetting gas of the contents of the aerosol vessel body is between 50/50 to 30/70.

4. A horizontal jetting structure aerosol product according to claim 1, wherein said lever is formed integrally with said nozzle.

* * * * *